(12) United States Patent
Amir

(10) Patent No.: US 8,018,584 B1
(45) Date of Patent: Sep. 13, 2011

(54) VIRTUAL WALLS IN INFRARED BASED RTLS SYSTEMS

(75) Inventor: Israel Amir, Princeton, NJ (US)

(73) Assignee: Centrak, Inc., Newtown, PA (US)

( * ) Notice: Subject to any disclaimer, the term of this patent is extended or adjusted under 35 U.S.C. 154(b) by 252 days.

(21) Appl. No.: 12/174,964

(22) Filed: Jul. 17, 2008

Related U.S. Application Data

(60) Provisional application No. 60/959,916, filed on Jul. 17, 2007.

(51) Int. Cl.
*G01B 11/26* (2006.01)
(52) U.S. Cl. .................................. 356/139.08
(58) Field of Classification Search ........ 356/3.01–3.15, 356/4.01–4.1, 5.01–5.15, 6–22, 139.01–139.1
See application file for complete search history.

(56) References Cited

U.S. PATENT DOCUMENTS

| 6,781,338 B2 * | 8/2004 | Jones et al. .................... 318/567 |
| 7,185,478 B1 * | 3/2007 | Willis, II ..................... 56/10.2 A |
| 7,378,964 B1 | 5/2008 | Amir et al. |
| 2004/0085037 A1 * | 5/2004 | Jones et al. .................... 318/567 |
| 2008/0007203 A1 * | 1/2008 | Cohen et al. .................. 320/104 |

* cited by examiner

*Primary Examiner* — Thomas H Tarcza
*Assistant Examiner* — Luke D Ratcliffe
(74) *Attorney, Agent, or Firm* — RatnerPrestia

(57) ABSTRACT

Methods and systems for locating a portable device in an enclosure having a location defining a virtual wall are provided. The system includes first and second infrared (IR) transmitters directed to opposite sides of the virtual wall. Each of the transmitters is configured to selectively transmit an interfering IR signal (IIS) and a data signal including a corresponding transmitter location ID.

26 Claims, 9 Drawing Sheets

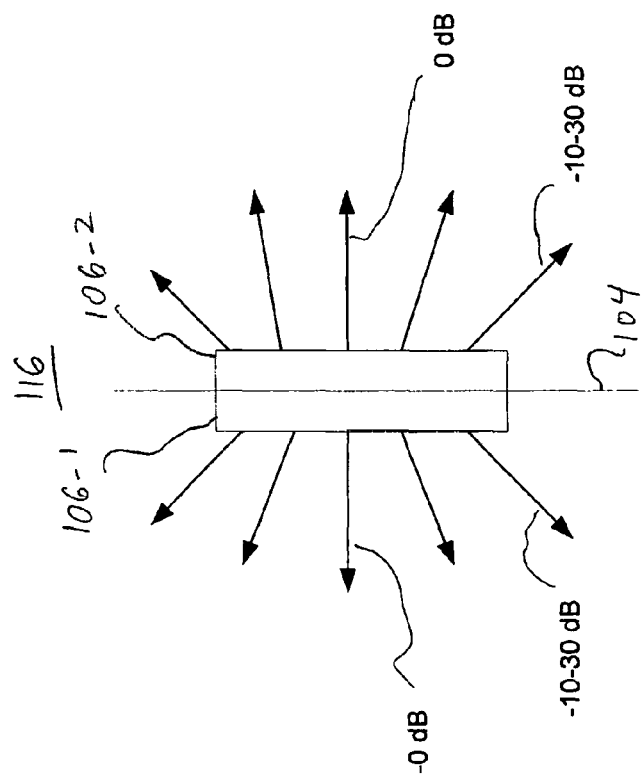
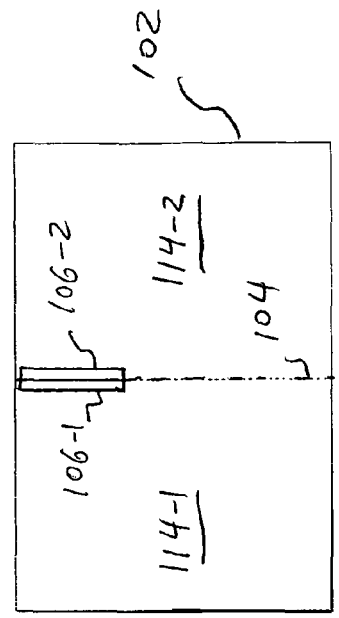
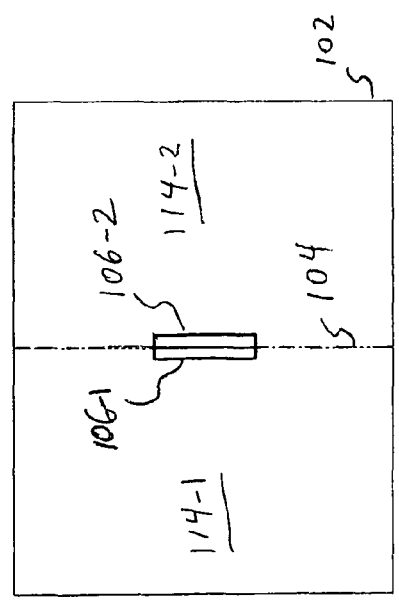
FIG. 2A
FIG. 2B
FIG. 2C

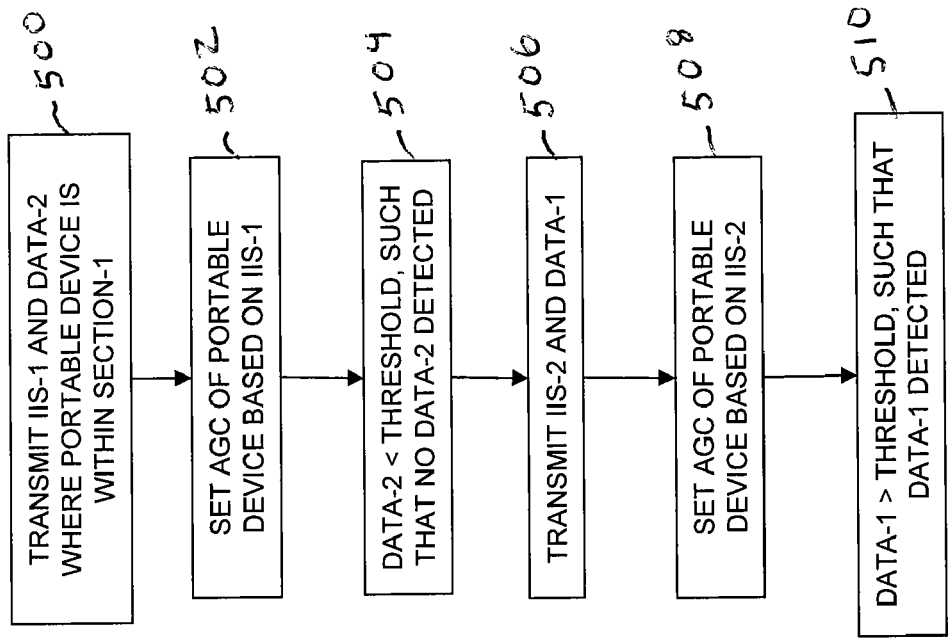

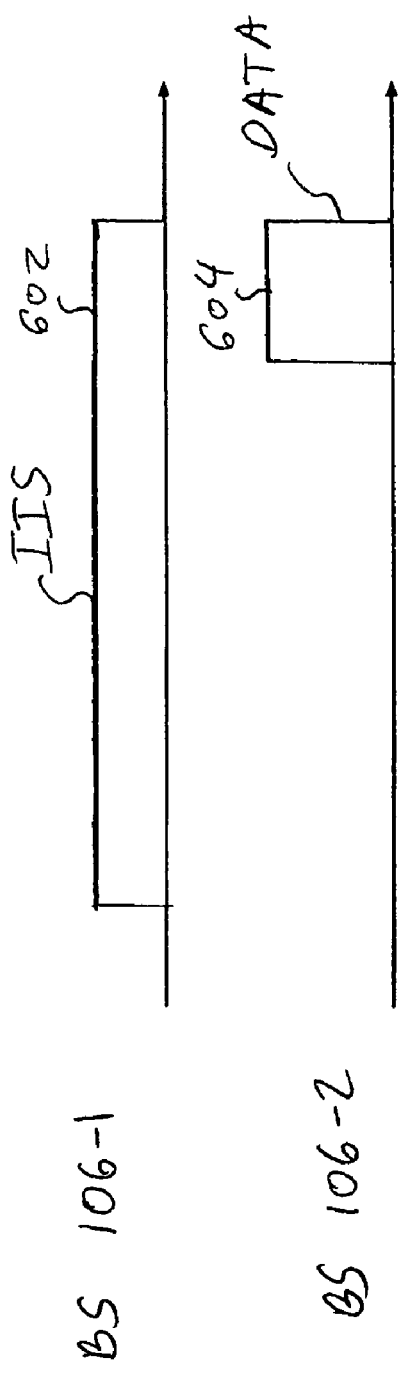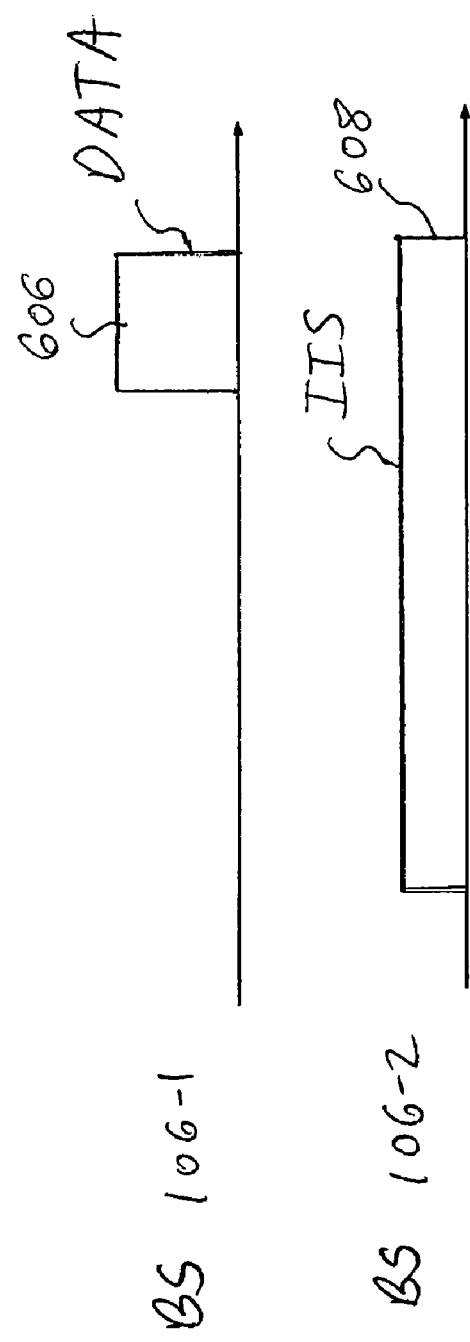

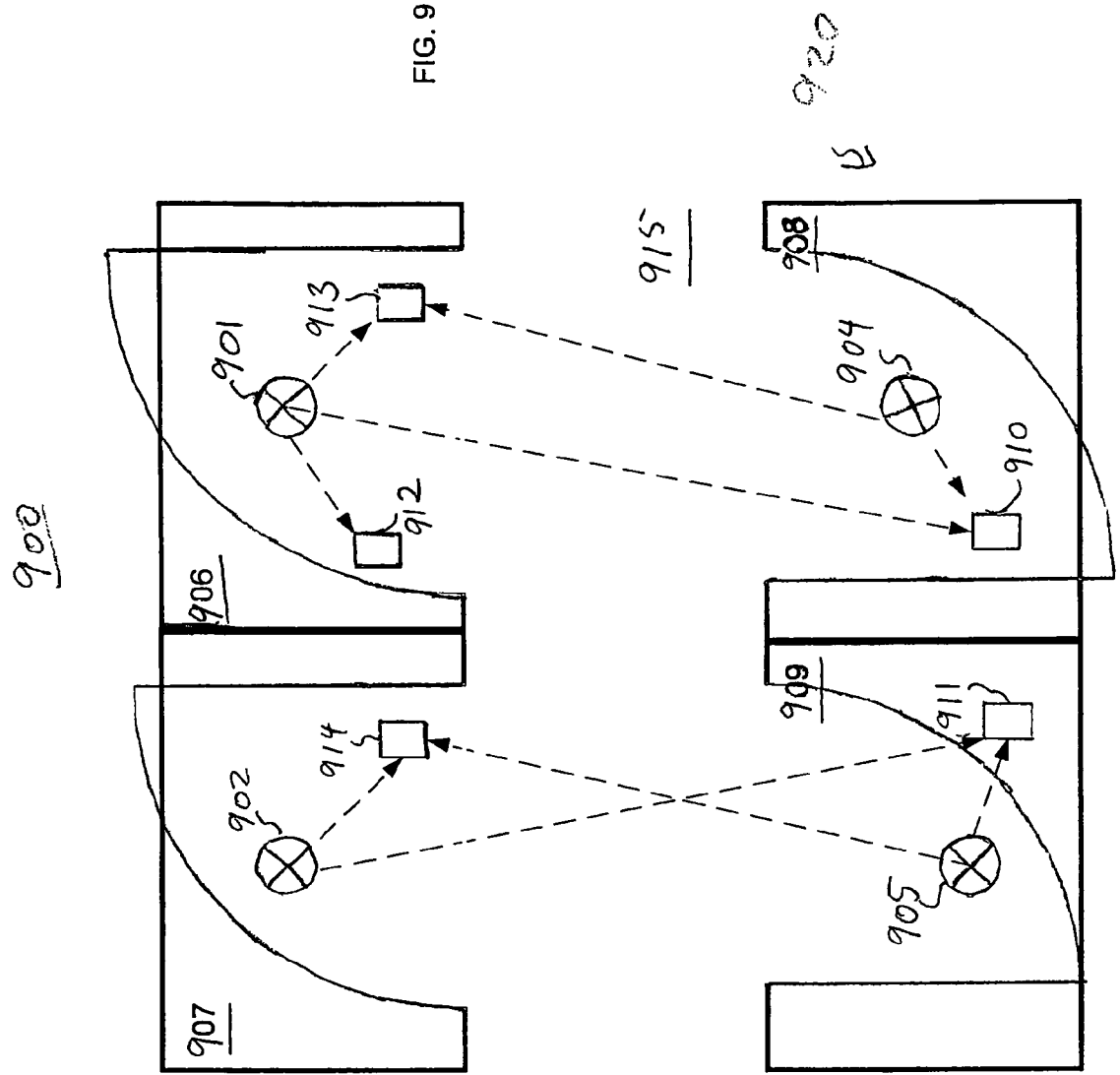

ial patent application No. 60/959,916, Filed Jul. 17, 2007. The contents of which are incorporated herein by reference.

VIRTUAL WALLS IN INFRARED BASED RTLS SYSTEMS

CROSS REFERENCE TO RELATED APPLICATIONS

This patent application claims the benefit of priority from U.S. Provisional patent application No. 60/959,916, Filed Jul. 17, 2007. The contents of which are incorporated herein by reference.

FIELD OF THE INVENTION

The present invention relates to real-time location systems. In particular, the present invention relates to methods and systems for defining virtual walls in an enclosure and for locating portable devices in an enclosure having a location defining a virtual wall.

BACKGROUND OF THE INVENTION

Real-time location (RTL) systems have become popular in recent years. Conventional RTL systems typically use radio frequency (RF) transmission to determine location. The RF based methods typically do not provide enough accuracy to support room and sub-room level accuracies, because the RF transmissions may penetrate walls. The use of infrared (IR) has become more popular for some RTL systems in order to support room level accuracy, because infrared signals (and any other optical wavelength) may be completely blocked by walls. Accordingly, for IR based RTL systems, if an infrared signal is received within an enclosed room, it may be assumed that a portable device, that may transmit or receive the infrared signal, is within the room.

The conventional "IR method" typically employs an IR transmitter on a portable device (i.e. a tag) and IR receivers in base stations that are scattered in rooms and corridors within the enclosure. A portable device ID is typically received by one of IR the base stations and the location of the portable device is determined based on its vicinity to a base station. A portable device-based IR transmitter typically needs a line of sight between the transmitter and a receiver (i.e. a base station) in order to robustly detect the device ID. This type of RTL system, thus, is occasionally prone to a lack of reception by the receiver base stations when the line of sight is blocked, making it susceptible to reliability problems.

There is also another type of IR system that employs IR transmitters at the base stations and IR receivers at the portable device which attempts to solve the problem of poor IR sensitivity, by transmitting substantially higher power levels than wired stationary base stations are typically capable of.

SUMMARY OF THE INVENTION

The present invention relates to systems for locating a portable device in an enclosure having a location defining a virtual wall. The system includes first and second infrared (IR) transmitters directed to opposite sides of the virtual wall. Each of the transmitters is configured to selectively transmit an interfering IR signal (IIS) and a data signal including a corresponding transmitter location ID.

The present invention also relates to a virtual wall base station including first and second infrared (IR) transmitters positioned relative to a location in an enclosure defining a virtual wall. The first and second IR transmitters are directed to opposite sides of the virtual wall. The virtual wall base station also includes an IR base station coupled to the first and second IR transmitters and configured to selectively transmit an interfering IR signal (IIS) and a data signal including a corresponding transmitter location ID via the first and second IR transmitters. The IR base station transmits the IIS from first IR transmitter that is remote from a portable device at a level that is to set a signal to noise ratio (SNR) threshold of the portable device such that the data signal transmitted via the second IR transmitter is received by the portable device with a magnitude greater than the SNR threshold.

The present invention further relates to a method for locating a portable device in an enclosure having a location defining a virtual wall. The method includes a) transmitting an interfering infrared signal (IIS) from a first infrared (IR) transmitter and a data signal from a second IR transmitter, where the data signal includes a corresponding transmitter location ID and b) setting a signal to noise ratio (SNR) threshold of a portable device based on a level of the transmitted IIS signal that is received by the portable device. When the first IR transmitter is located proximate to the portable device and the second IR transmitter is located remote from the portable device, the transmitted data signal is received by the portable device with a magnitude less than the SNR threshold. When the second IR transmitter is located proximate to the portable device and the first IR transmitter is located remote from the portable device, the transmitted data signal is received by the portable device with a magnitude greater than the SNR threshold.

BRIEF DESCRIPTION OF THE DRAWINGS

The invention may be understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIGS. 2A and 2B are top plan views illustrating an orientation of IR base stations in the enclosure, according to an embodiment of the present invention;

FIG. 2C is a side plan view illustrating an orientation of IR base stations in the enclosure, according to an embodiment of the present invention;

FIG. 5 is a flow chart illustrating a method for determining the location of a portable device in an enclosure having a virtual wall, according to an embodiment of the present invention;

FIGS. 6A and 6B are graphs of interfering infrared signal (IIS) and DATA signal transmissions versus time for first and second IR base stations, according to an embodiment of the present invention;

FIG. 9 is a top plan view of a system for locating portable devices in an enclosure having an open floor plan, according to another embodiment of the present invention.

DETAILED DESCRIPTION OF THE INVENTION

Figure 1:
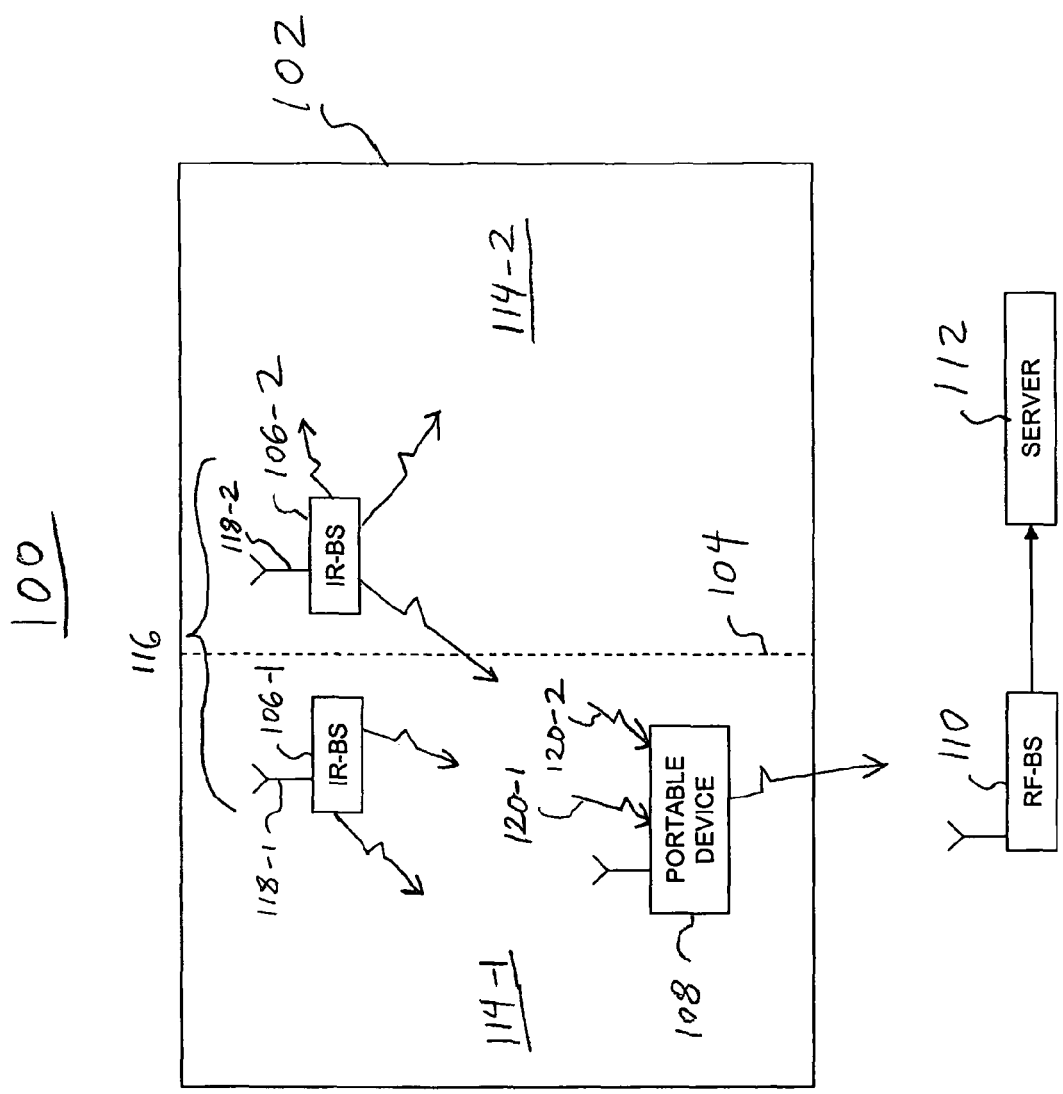
FIG. 1 is a block diagram of a system for locating a portable device in an enclosure having a virtual wall, according to an embodiment of the present invention.

As described above, there are generally two methods used by infrared RTL systems to determine a physical location of a portable device in an enclosure. In the first method, a mobile portable device transmits an infrared signal to a stationary infrared receiver base station, represented as a DATA signal. In the transmission, the portable device includes its device ID (with possibly other information) as part of the DATA signal. The stationary infrared receiver base station receives the DATA signal from the portable device and communicates (either wired or wirelessly) the received device ID, along with a base station ID to a central station. The central station associates the portable device ID with the known location of the receiver base station to determine the physical location of the portable device.

In the second method, stationary base-stations (typically one in a room or in isolated zones) transmit infrared DATA signals that include the respective base station ID (and possibly other information) to a mobile portable device. The portable device transmits the received base station ID and the portable device ID to a central station, typically using RF transmission. The central station associates the known location of the transmitting stationary base stations with the portable device ID to determine the physical location of the portable device.

Both of these types of methods may have a disadvantage with respect to location resolution, because they rely on physical walls to define a device location resolution for the system. It may be desirable, in many applications, to provide a higher degree of location accuracy. For example, a hospital room is typically divided into two "virtual" halves, where two patients may share the same room. It may be advantageous to determine a location of each patient relative to the virtual halves of the room or to determine which assets are dedicated to each of the patients. In this example, patients and assets may each include a mobile portable device that may be used to determine the location of the patients and assets. In another example, emergency rooms in an emergency department are often separated by transparent curtains. The curtains may be pulled back when one or more of the emergency rooms is not occupied, and large contiguous space may be formed. It may not be feasible to accurately locate on instrument or a patient using conventional IR RTL systems which rely on the physical walls to locate a portable device. Although examples relative to a hospital are described, it is understood that similar issues exist not only in hospitals but also with respect to many other institutions, such as warehouses.

The present invention relates to systems and methods for defining virtual walls in an enclosure and for determining a physical location of a portable device in an enclosure having a virtual wall. The portable device is positioned relative to a first side of the virtual wall. At least two IR transmitters may be positioned on opposite sides of the virtual wall and may be configured to selectively transmit an IIS and a DATA signal. An IIS transmitted from a second side of the virtual wall is received by the portable device and used to set an automatic gain control (AGC) threshold of the portable device. A level of the transmitted IIS is selected such that a DATA signal received from the transmitter on the first side of the virtual wall (i.e. the same side as the portable device) has a magnitude that is greater than the AGC threshold. Conversely, an IIS transmitted from the first side sets the AGC threshold such that a DATA signal transmitted from the transmitter on the second side of the virtual wall (i.e. from an opposite side with respect to the portable device) is less than the AGC threshold. In this manner, the IIS transmitted by at least one of the IR transmitters functions to substantially minimize detection of a DATA signal by the transmitter on a side of the virtual wall that is opposite from the portable device. According to another embodiment, the enclosure may be portioned into a plurality of virtual walls. The virtual walls may partition rooms or zones into virtual sections and may significantly improve a localization accuracy of the portable device.

Referring now to FIG. 1, a block diagram is shown of a system 100 for determining a location of a portable device 108 in an enclosure 102 having virtual wall 104, and where virtual wall 104 partitions enclosure 102 into two sections 114. System 100 may include at least two IR base stations (IR-BS's) 106, one or more portable devices 108 and at least one RF base station (RF-BS) 110. IR-BS's 106-1, 106-2 are positioned on opposite sides of virtual wall with IR transmission directions generally facing opposite directions, described further below with respect to FIGS. 2A-2C, 3A and 3B. The combination of IR-BS's 106-1, 106-2 form a virtual wall base station 116.

IR base stations 106 may selectively transmit very short bursts of DATA signals and an IIS. Each IR base station 106 may transmit a unique base station ID as part of the respective DATA signal that may be identified at a central control as originating from a particular section 114 of enclosure 102. Although two' IR base stations 106 are illustrated in FIG. 1 as forming virtual wall base station 116, virtual wall base station 116 may be formed from one base station 106 having two IR transmitters 118-1, 118-2. IR-BS's 106 may be powered by a battery or by an external power supply. Although two IR transmitters 118-1, 118-2 are shown in FIG. 1, it is contemplated that a single IR transmitter 118 may be used with fiber optic antennas gated by liquid crystal display (LCD) light values.

In an exemplary embodiment, the DATA signal may be an infrared signal burst, of about 20 milliseconds in duration. The duration of the IIS may vary but is desirably of longer duration than the DATA signal, in order to set the AGC threshold (and to account for any settlement time for the AGC). The IIS may be a continuous transmission (modulated at the desired rate, e.g., 38 KHz). It is understood that IIS may be selected from a number of different forms in order to provide a suitable interfering signal level to set the AGC threshold of portable device 108 to detect a DATA signal from IR-BS 106 in a same section 114 as portable device 108. For example, IIS may include on/off signals (i.e., "one", "zero" signals) in either a similar basic rate of the DATA signal or a different rate. Although an AGC threshold is described, an AGC threshold represents an exemplary embodiment. In general, the IIS level may be used to set a signal to noise ratio (SNR) threshold of portable device 108.

In order to form virtual wall base station 116, IR-BS's 106 may synchronize their transmissions of IIS and DATA signals. It is contemplated that the synchronization of transmissions may be performed electronically by connecting a synchronization signal between IR-BS's 106-1 and 106-2. As another example, each IR-BS 106 may be configured to wirelessly receive a system beacon (such as via an RF transceiver) that includes synchronization information for IR-BS's 106.

Portable devices 108 may be provided for persons or apparatus, such as medical equipment. The portable devices 108 may include an IR receiver (FIG. 4) and an RF transmitter (not shown) which are coupled to each other. In this manner, the IR receiver may receive the DATA signal that includes the respective base station ID and may transmit the received base station ID and its device ID via the RF transmitter at an RF carrier frequency to RF base station 110.

The modulated carrier signal received by RF base station 110 may be decoded to reproduce the base station ID and the device ID, for example, by a decoding network (not shown), by server 112 or by RF base station (RF-BS) 110. The base station ID and the device ID may be used by server 112 to determine where a particular person or device is located within virtual enclosure 102 relative to virtual sections 114-1 and 114-2.

As shown in FIG. 1, because there is no physical wall, portable device 108 may receive respective IR transmissions 120 from both IR-BS 106-1, 106-2. As described above, each IR-BS 106 has a corresponding base station ID. If both base station ID's are detected by portable device 108, it may be difficult to determine the location of portable device relative to virtual wall 104.

According to one embodiment of the current invention, when one base-station (e.g., IR-BS 106-2) transmits a DATA signal the other base station (e.g., IR-BS 106-1) transmits an IIS. Next, the two base-stations exchange roles. The one base-station (e.g., IR-BS 106-2) transmits HS and the other base station (e.g., IR-BS 106-1) transmits the DATA signal. The IIS level is desirably substantially weaker than the DATA infrared signal. An explanation of the use of IIS to control detection of a DATA signal is provided below.

IR signal 120-2 that is transmitted by IR-BS 106-2 (with IR-BS 106-2 being positioned behind portable device 108), may be significantly attenuated when received by portable device 108. Although IR signal 120-2 may be significantly attenuated behind IR-BS 106-2, IR signal 120-2 may still be easily detected by the portable device 108. The transmitted power of IR-BS 106-2 may be reduced such that IR signal 120-2 may not be detected by portable device 108. The reduction of transmitted power, however, may reduce the reliability of DATA signal detection from IR-BS 106-1, for example, where portable device 108 is not facing IR-BS 106-1 or its line of sight to IR-BS 106-1 is occluded.

For example, assume that the signals from IR-BS 106-2 are attenuated by 10 dB (10:1) in section 114-1 due to the front-to-back isolation between IR-BS's 106. In this case, an interfering signal (i.e. IIS) may be transmitted by the IR-BS 106-1 (pointing toward section 114-1 relative to virtual wall 104) which is 10 dB less than a DATA signal transmitted by IR-BS 106-2. Accordingly, DATA signals from IR-BS 106-2 may not be detected in section 114-1.

In practice, the transmitted IIS raises an AGC level of the IR receiver module (FIG. 4) in portable device 108 such that DATA signals from an IR-BS 106 on an opposite side of virtual wall 104 (e.g., IR-BS 106-2) are below the AGC level of portable device 108. In this example, an IIS is transmitted from IR-BS 106-2 at about 1/10 of DATA signal levels of IR-BS 106-1. Accordingly, an IIS (from IR-BS 106-2) may reach section 114-1 at a level of about 1/100 relative to the DATA signal transmitted by IR-BS 106-1 (because the IIS may be attenuated by a "back-to-front" isolation between IR-BS's 106). Accordingly, a level of interference of the IIS on the DATA signal transmitted in section 114-1 is substantially minimum. Thus, an HS transmitted in section 114-1 may be used to substantially block detection of a DATA signal transmitted from section 114-2, but an HS signal transmitted from section 114-2 may not interfere with a DATA signal transmitted in section 114-1. A level of the IIS may be selected to produce a noise level (on the transmitted IIS side of virtual wall 104, e.g., section 114-1) that is high enough so that a DATA signal (transmitted from the other side of virtual wall 104, e.g., from section 114-2) is attenuated and has a magnitude that is too low to be detected by portable device 108. In general, the DATA signal may be attenuated because of the isolation and directionality of the DATA signal. The IIS may be attenuated when it is transmitted to the other side of virtual wall 104 (i.e. transmitted from section 114-1 into section 114-2). In contrast, a DATA signal on the transmitted DATA side of virtual wall 104 (e.g., from section 114-2) has a higher signal strength than the IIS (transmitted from section 114-1 to section 114-2), thus allowing the DATA signal to be detected by portable device 108 on the DATA side.

Figure 3A:
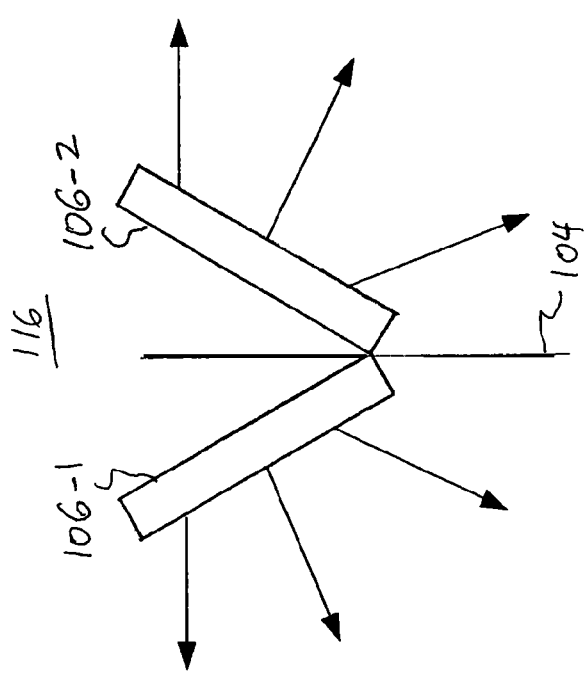
FIGS. 3A and 3B are side plan views illustrating an orientation of IR base stations in the enclosure, according to an another embodiment of the present invention.
Figure 3B:
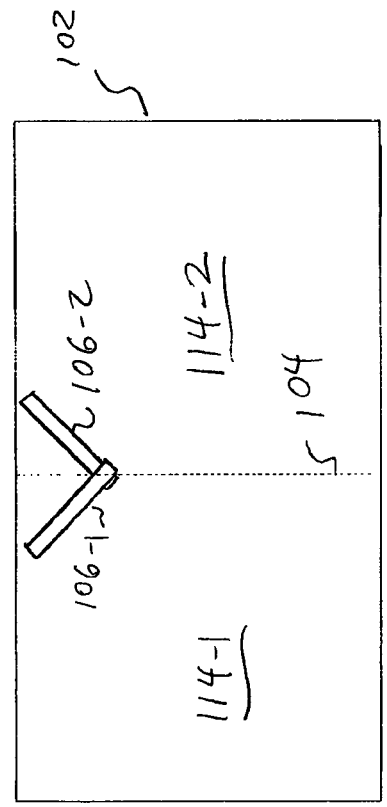

Referring next to FIGS. 2A, 2B, 2C, 3A and 3B, diagrams are shown illustrating orientation of IR-BS's 106 in enclosure 102. In particular, FIG. 2A is a top plan view of IR-BS's 106-1 and 106-2 with parallel orientation relative to virtual wall 104; FIG. 2B is an top plan view of enclosure 102 with IR-BS's 106; FIG. 2C is a side plan view of enclosure 102 with IR-BS's 106 with parallel orientation; FIG. 3A is a side plan view of IR-BS's 106 with angled orientation relative to virtual wall 104; and FIG. 3B is a side plan view of enclosure 102 with IR-BS's 106 at an angled orientation.

As shown in FIGS. 2C and 3B, IR-BS's 106 may be mounted from or near a ceiling, relative to virtual wall 104 of enclosure 102. IR-BS's 106 may also be mounted at an AC receptacle (not shown). IR-BS's 106 may be battery powered or may be activated from an available power source.

In general, virtual wall base station 116 is formed form two joined base-stations 106-1, 106-2 that point to two significantly different directions. As another option, virtual wall base station may be formed from one IR-BS 106 with two IR transmitters 118 that point to two significantly different directions. IR-BS's 106 are typically designed such that their respective transmission pattern are directional, typically with a null (i.e. a minimum transmission strength) directed toward the back of the IR base station 106. For example, IR-BS's 106 typically have a number of IR diodes, but may not include IR diodes in the sense that they do not have any infrared diodes at a back of IR-BS 106, because one side is typically directed to the ceiling (or wall).

As shown in FIG. 2A, IR-BS's 106 may be positioned parallel to each other and may direct IR transmissions in opposite (i.e., 180 degrees) directions. According to another embodiment, as shown in FIG. 3A, IR-BS's 106 may be positioned at an angle relative to virtual wall 104 and may direct IR transmissions with an angular separation of less than 180 degrees.

Figure 4:
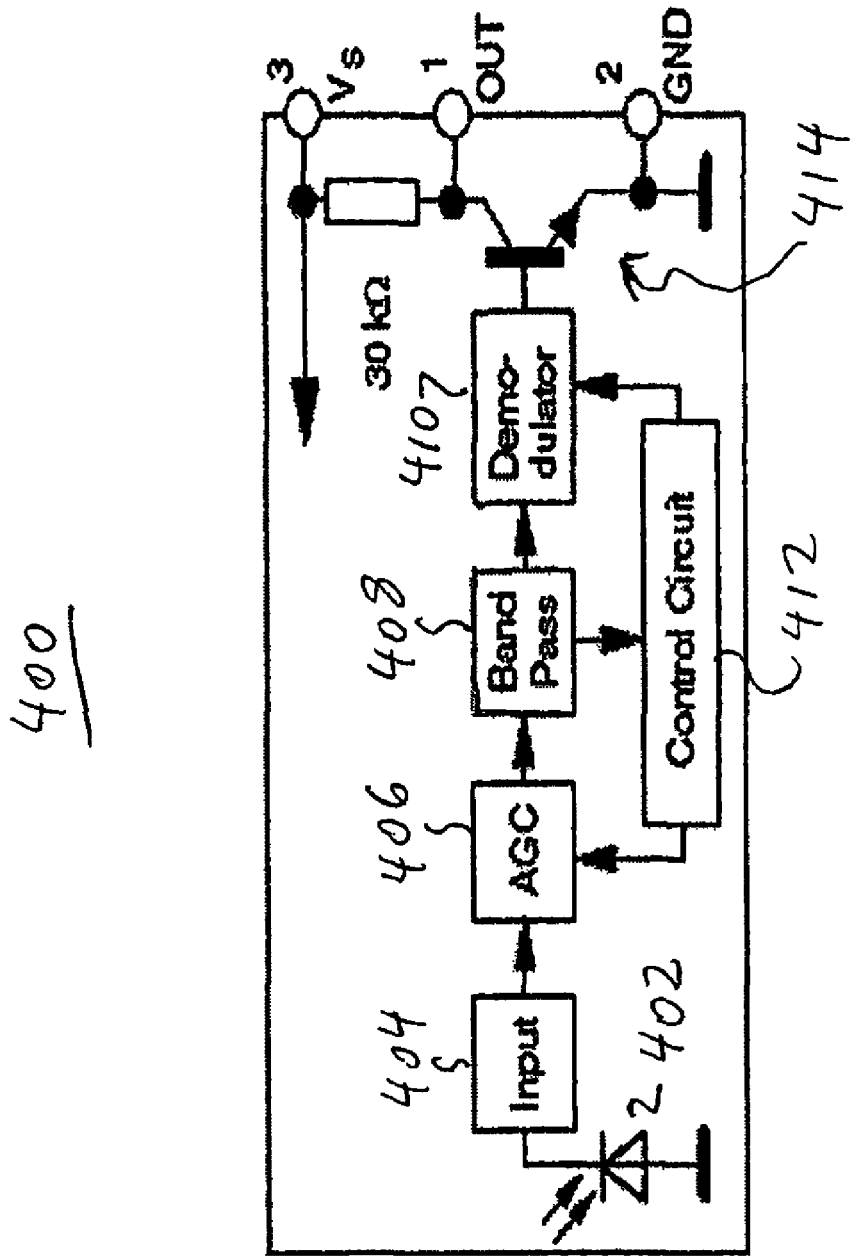
FIG. 4 is a block diagram of an IR receiver module of a portable device shown in FIG. 1.

Referring now to FIG. 4, a block diagram of an IR receiver module 400 of portable device 108 is shown. IR receiver module 400 includes IR detector 402, input signal conditioning module 404, AGC module 406, band pass filter 408, demodulator 410 and output stage 414. IR receiver module 400 may also include control circuit 412 to control AGC module 400 and demodulator 410 responsive to band pass filter 408. Although in an exemplary embodiment IR receiver module 400 includes a Vishay Semiconductors model TSOP362 IR receiver module, it is understood that any suitable IR receiver module having an AGC module may be used.

IR detector 402 may be configured to receive IR transmissions, for example, HS signals and DATA signals including associated base station IDs, from IR-BS's 106 (FIG. 1). IR detector 402 may detect IR signals from a number of IR base stations 106. Suitable components for IR detector 404, signal conditioning module 404, AGC module 406, band pass filter 408, demodulator 410, output stage 414 and control circuit are well known to the skilled person.

Because the dynamic range of infrared sensors elements is limited, IR receiver module 400 employs an AGC module 406. AGC module 406, in general, sets a front-end amplifier gain based on an average of an observed signal and sets a threshold level just above the background signal levels. Different IR receiver modules 400 may have AGC modules 406 with different averaging speeds, to provide solutions for different signal detection situations. For example, a slowly averaging AGC module 406 (i.e. a slow AGC) maintains (and builds) its average value over a longer time period. Accordingly, a slow AGC may be suitable if a detected signal burst length has a long duration. Likewise, if the signal burst length is short, it may be more desirable to select an AGC module 406 with a faster averaging speed. The selection of a suitable AGC module 406 may also depend on a variety of other parameters, such as the type of background noise and/or a power consumption of IR receiver module 400. For example, if the background optical noise is high, the AGC will set the threshold to a higher level, thus reducing the sensitivity of IR receiver module 400. The present invention desirably utilizes these properties of AGC module 406 to create virtual walls 104 (FIG. 1).

Referring next to FIGS. 1 and 5, a flow chart shows a method for determining the location of portable device 108 in enclosure 102 having virtual wall 104, according to an embodiment of the present invention. In FIG. 5, it is assumed that portable device 108 is located in section 114-1. At step 500, an IIS is transmitted from IR-BS 106-1 (referred to herein as IIS-1) and a DATA signal is transmitted from IR-BS 106-2 (referred to herein as DATA-2). Referring to FIG. 6A, graphs of IIS 602 and DATA signal 604 transmissions versus time are shown for IR-BS's 106-1,106-2, respectively. IR-BS 106-1 transmits IIS 602 with a predetermined amplitude that is generally less than the amplitude of DATA signal 604. As shown in FIG. 6A, IIS 602 is transmitted prior to an onset of DATA signal 604, in order to set the AGC threshold, to provide a suitable amount of settling time for AGC module 406 (FIG. 4) of portable device 108. In addition, IIS 602 is also transmitted concurrently with DATA signal 604.

Referring back to FIG. 5, at step 502, an AGC threshold is set in portable device 108 based on the received IIS-1. In particular, a level of the IIS-1 is set such that a magnitude of DATA-2 received at portable device 108 is less than the AGC threshold. At step 504, portable device 108 does not detect DATA-2, because the magnitude of DATA-2 is less than the AGC threshold.

In order to determine where portable device 108 is relative to virtual wall 104, the transmission of the IIS and DATA signals are switched on IR-BS's 106. At step 506, an IIS is transmitted from IR-BS 106-2 (referred to herein as IIS-2) and a DATA signal is transmitted from IR-BS 106-1 (referred to herein as DATA-1). Referring to FIG. 6B, graphs of DATA signal 606 and IIS 608 transmissions versus time are shown for IR-BS's 106-1,106-2, respectively. DATA signal 606 and IIS signal 608 are the same as respective DATA signal 604 and IIS 602, except that the IIS and DATA signal are transmitted on opposite IR-BS's 106.

Referring back to FIG. 5, at step 508, an AGC threshold is set in portable device 108 based on the received IIS-2. In particular, a level of the 115-2 is set such that a magnitude of DATA-1 is greater than the AGC threshold. At step 510, portable device 108 detects DATA-1, because the magnitude of DATA-1 is greater than the AGC threshold. As described above, each of IR-BS's 106 has a unique ID. Accordingly, when portable device 108 transmits the detected base station ID to central sever 112, central server 112 knows which side of virtual wall base-station 116 was "heard" by the portable device.

According to one embodiment of the present invention, a signal strength of the IIS may be less than a strength of the DATA signal. The strength of the IIS relative to the DATA signal, in general, depends mainly on a natural optical separation between the two sides. For example, if the optical separation is about 20 dB, then the IIS level need not exceed −20 dB, relative to the DATA signal. In this example, the IIS (transmitted on one side of virtual wall 104) and the DATA signal (transmitted on the other side of virtual wall 104) will be equal throughout the IIS virtual wall side (i.e. on the one side). In this case, portable device 108 located on the IIS side may not be able to detect the DATA signal (transmitted from the other side). In general, in order to detect the DATA signal (transmitted from the other side), at least a 10 dB signal-to-noise-ratio (SNR) is desirable. A portable device that is located on the DATA signal side may have at least about a 40 dB signal-to-IIS ratio, as the IIS has an optical separation from the DATA signal side of about 20 dB.

Figure 7A:
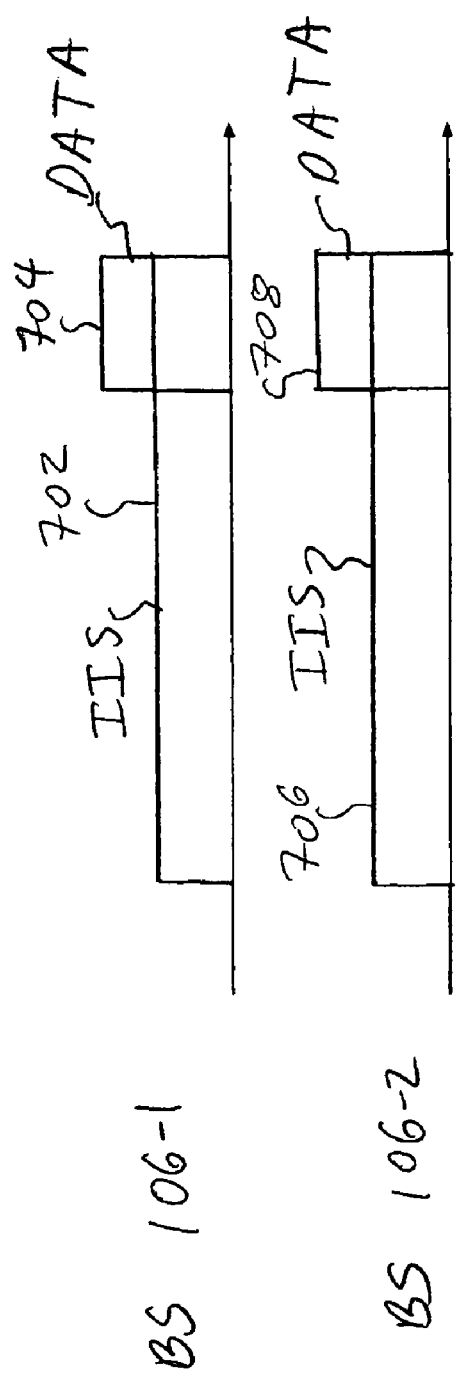
FIGS. 7A and 7B are graphs of IIS and DATA signal transmissions versus time for first and second IR base stations, according to further embodiments of the present invention.
Figure 7B:
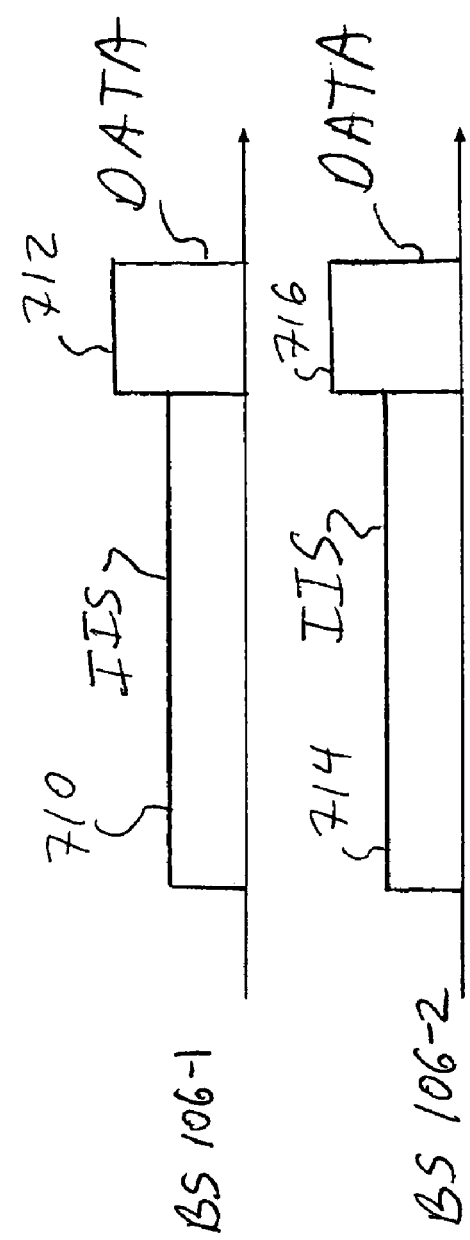

Although FIGS. 5, 6A and 6B illustrate a sequential switching of the IIS and DATA signal transmissions by IR-BS's 106, it is contemplated that steps 500-504 may be formed parallel with steps 506-510. Referring to FIGS. 7A and 7B, graphs are shown of IIS and data signal transmissions versus time for first and second IR base stations with parallel transmission of the IIS and DATA signal by both IR-BS's 106.

In FIG. 7A, both IIS 702, 706 as well as DATA signals 704, 712 are transmitted simultaneously from each of respective IR-BS's 106. In addition, IIS 702, 706 overlap respective DATA signals 704, 708. This approach may allow faster determination by portable device 108 (FIG. 1) (and central base station 110) of the location of portable device 108 relative to the virtual wall 104.

With respect to FIG. 7A, the AGC threshold of portable device 108 (FIG. 1) may rise due to the transmissions from each side of virtual wall 104, in order to eliminate the possibility that portable device 108 would "hear" a DATA signal from the side remote from portable device 108. As described above, the IIS level is determined by the isolation between the two sides. In this embodiment, a level of IIS may be reduced as compared with a level used for transmission according to FIGS. 6A and 6B. For example, the IIS level may be reduced in this embodiment, because the IIS on each side is a combination of the IIS and an IIS leakage from the remote side. The leakage is typically very small (isolation dependent). Although the AGC threshold is elevated for both sides, the DATA signal is typically designed to be much higher than the IIS such that a DATA signal from the side remote to portable device 108 may still be suppressed. The speed of the AGC may be selected to take into consideration the level of the IIS transmitted from a same side IR-BS 106.

With respect to FIG. 7B a lower cost implementation of the embodiment shown in FIG. 7A is illustrated. The embodiment shown in FIG. 7B is similar to that of FIG. 7A, except that, in this example, IIS 710, 714 are not transmitted during the DATA signals 712, 716. This approach does not need two parallel front-ends to feed a transmitter of IR-BS's 106. A disadvantage of this approach is that the AGC level may not be in as stable a position as compared with the embodiment shown in FIG. 7A. It is understood that, for this embodiment, a relatively low speed AGC may be selected such that the AGC state does not change substantially during the DATA signal 712, 716 transmission.

As shown in FIGS. 6 and 7, the IIS and DATA signals are not transmitted with a same transmission power level. There are two methods to control the transmitted power by the IR transmitter. In practice, infrared transmitters are typically designed using banks of light emitting diodes (LEDs). A first method to control the transmitted power is to control the number of active LEDs. For example, to first transmit a lower IIS power about 10% of the LEDs may be activated. To transmit the DATA signal about 100% of the LEDs may be activated.

A second method to control the transmitted power is to control the current that is driven into the LED bank. In this case all of the LEDs may be activated but, they may be activated with different currents in different parts of the signal. This second method may not be appropriate when two types of signals are transmitted at the same time (e.g., both the IIS and the DATA signal shown in FIG. 7A). In this case, the IIS and the DATA signals may be transmitted on different LED banks.

Figure 8:
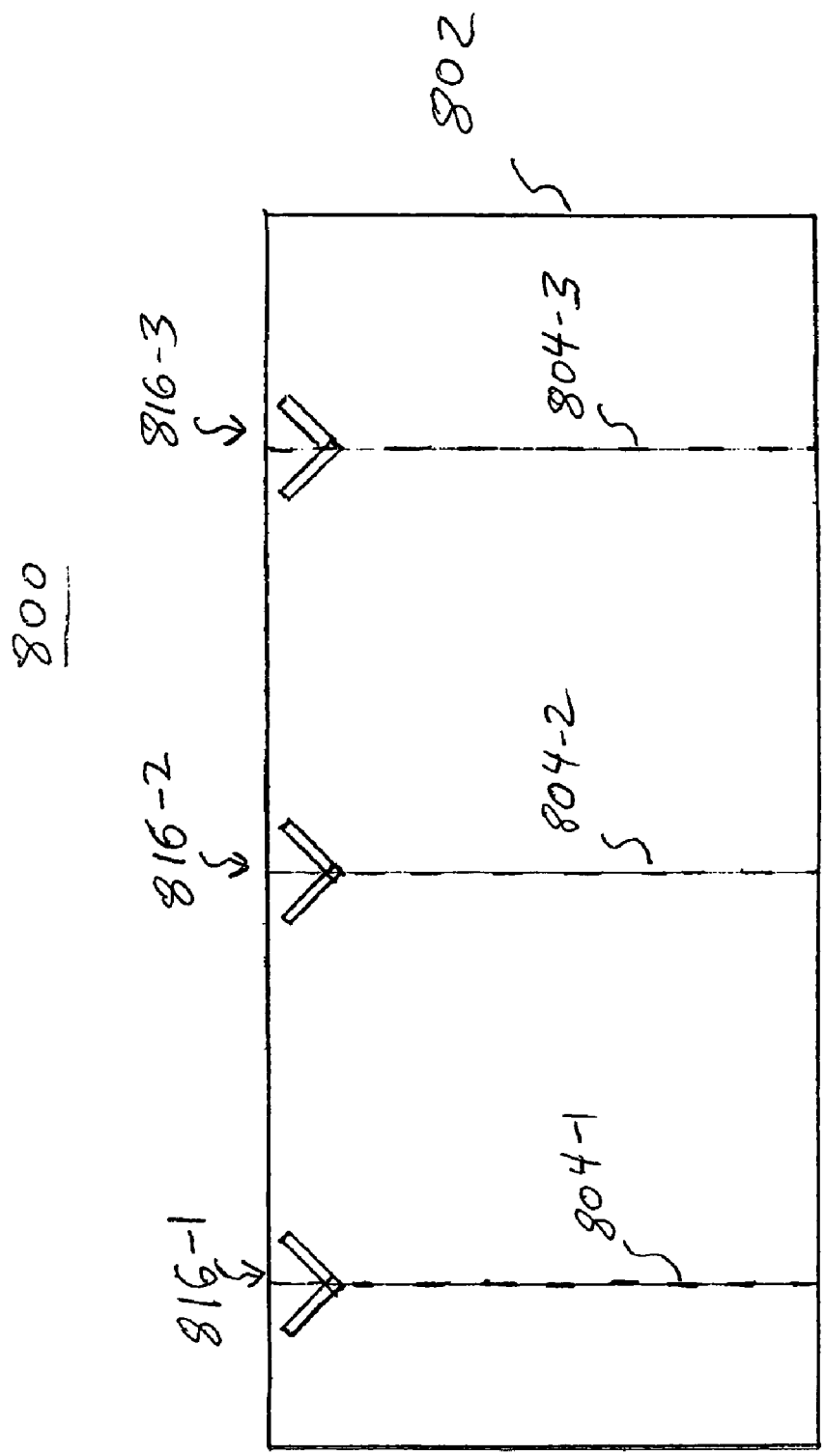
FIG. 8 is a side plan view of another system for locating a portable device in an enclosure having a plurality of virtual walls, according to another embodiment of the present invention.

FIG. 8 is a another system 800 for locating a portable device in an enclosure 802 having a plurality of virtual walls 804. A plurality of virtual wall base stations 816 are associated with respective virtual walls 804. In enclosure 802, if an IIS is transmitted in one section, there may be another virtual wall DATA signal that may not be able to cover this section at the same time. Accordingly, to provide multiple virtual wall coverage, the different virtual walls 804 may be synchronized to such that they may operate at different times. In particular, a pair of IR transmitters that each transmit into a virtual room (defined by two consecutive virtual walls 804) may transmit the same signals. Accordingly, it is desirable to synchronize these pairs of IR transmitters. For example, IR transmitters between virtual walls 804-1 and 804-2 may be synchronized.

FIG. 9 is a block diagram of a system 900 for locating portable devices 910, 911, 912, 913, 914 in an enclosure 920 having an open floor plan, according to another embodiment of the present invention. In many practical applications there are open rooms 906, 907, 908, 909 separated by a corridor 915. Typically infrared signals may not be used successfully in such cases, because the transmission of base-stations 901, 902, 904, 905 in opposing rooms may interfere with a robust operation of the portable devices 910-914.

As one example, a virtual wall may be located to separate the two sides of corridor 915. However, a simpler solution may be shown using the above-described principles. There is already some level of optical isolation between the two sides of corridor 915, because of the physical distance. It is contemplated that some physical barrier may be added to further attenuate infrared transmission from one side of corridor 915 to the other side. Although the propagation of light traveling from one side to the other side of corridor 915 may not be completely eliminated, the two sides of corridor 915, collectively, may be considered to form two sides of a virtual wall. Accordingly, a virtual wall may be formed by corridor 915. Base stations 904, 905 on one side of corridor 915 may transmit respective DATA signals whereas base stations 901, 902 on the other side of corridor 915 may transmit respective IISs. The IISs may be used to suppress base stations 904, 905 transmitting DATA signals from being detected by portable devices 912, 913, 914 in the IIS side of corridor 915.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A system for locating a portable device in an enclosure having a location defining a virtual wall, the system comprising:
    first and second infrared (IR) transmitters directed to opposite sides of the virtual wall, each of the transmitters configured to selectively transmit an interfering IR signal (IIS) and a data signal including a corresponding transmitter location ID, wherein the IIS signal and the data signal each have a signal strength and the signal strength of the IIS signal is less than the signal strength of the data signal.

2. The system according to claim 1, wherein a level of the IIS transmitted from the first IR transmitter that is remote from the portable device is used to set a signal to noise ratio (SNR) threshold of the portable device such that the data signal transmitted from the second IR transmitter is received by the portable device with a magnitude greater than the SNR threshold.

3. The system according to claim 2, wherein the level of the IIS transmitted from the second IR transmitter that is proximate to the portable device is used to set the SNR threshold such that the data signal transmitted from the first IR transmitter is received by the portable device with a magnitude less than the SNR threshold.

4. The system according to claim 2, wherein the SNR threshold includes an automatic gain control (AGC) threshold.

5. The system according to claim 4, wherein the portable device includes:
    an IR receiver module having an AGC module configured to receive the IIS and to set the AGC threshold responsive to the received IIS,
    wherein the portable device is configured to detect the data signal when magnitude of the data signal is greater than the AGC threshold, and
    the portable device is configured to transmit an output signal including a portable device ID representative of the portable device and the respective transmitter location ID from the detected data signal.

6. The system according to claim 5, further comprising:
    a radio frequency (RF) base station configured to receive the output signal from the portable device and to decode the portable device ID and transmitter location ID; and
    a server configured to determine a physical location of the portable device relative to the virtual wall based on the portable device ID and transmitter location ID received from the RF base station.

7. The system according to claim 1, wherein each of the first and second IR transmitters has a respective directional transmission pattern and each of the transmission patterns includes a null region having a minimum transmission strength, each null region being directed toward the opposite IR transmitter.

8. The system according to claim 1, further comprising an IR base station coupled to each of the first and second IR transmitters.

9. The system according to claim 8, wherein the IR base station includes first and second IR base stations respectively coupled to the first and second IR transmitters.

10. The system according to claim 8, wherein the IR base station and the first and second IR transmitters form a virtual base station and the virtual base station is one of a plurality of virtual base stations associated with a respective plurality of locations defining a plurality of virtual walls.

11. The system according to claim 10, wherein the plurality of virtual walls are arranged such that each consecutive pair of virtual walls define a virtual room, and
    each IR transmitter that transmits the corresponding IIS and/or the data signal within each respective virtual room is synchronized.

12. A virtual wall base station comprising:
first and second infrared (IR) transmitters positioned relative to a location in an enclosure defining a virtual wall, the first and second IR transmitters being directed to opposite sides of the virtual wall;
and an IR base station coupled to the first and second IR transmitters, the IR base station configured to selectively transmit an interfering IR signal (IIS) and a data signal including a corresponding transmitter location ID via the first and second IR transmitters,
wherein the IR base station transmits the IIS from first IR transmitter that is remote from a portable device at a level that is to set a signal to noise ratio (SNR) threshold of the portable device such that the data signal transmitted via the second IR transmitter is received by the portable device with a magnitude greater than the SNR threshold.

13. The virtual wall base station according to claim 12, wherein the first IR transmitter is positioned parallel to the second IR transmitter.

14. The virtual wall base station according to claim 12, wherein the first IR transmitter is positioned at an angle away from parallel with respect to the second IR transmitter.

15. The virtual wall base station according to claim 12, wherein the IR base station includes first and second IR base stations respectively coupled to the first and second IR transmitters.

16. The virtual wall base station according to claim 15, wherein the first and second IR base stations are synchronized with each other.

17. The virtual wall base station according to claim 12, wherein each of the first and second IR transmitters includes a plurality of light emitting diodes (LEDS).

18. The virtual wall base station according to claim 17, wherein a transmitting power of each of the first and second IR transmitters is controlled by at least one of adjusting a number of active LEDS among the plurality of LEDS to which current is applied or adjusting a level of a current driving the plurality of LEDS.

19. The virtual wall base station according to claim 17, wherein each of the first and second IR transmitters is configured to transmit both the IIS and the data signal in a same time period by selectively activating respective subsets of the LEDS.

20. A method for locating a portable device in an enclosure having a location defining a virtual wall, the method comprising:
a) transmitting an interfering infrared signal (IIS) from a first infrared (IR) transmitter and a data signal from a second IR transmitter, the data signal including a corresponding transmitter location ID; and
b) setting a signal to noise ratio (SNR) threshold of a portable device based on a level of the transmitted IIS signal that is received by the portable device,
wherein:
when the first IR transmitter is located proximate to the portable device and the second IR transmitter is located remote from the portable device, the transmitted data signal is received by the portable device with a magnitude less than the SNR threshold, and
when the second IR transmitter is located proximate to the portable device and the first IR transmitter is located remote from the portable device, the transmitted data signal is received by the portable device with a magnitude greater than the SNR threshold.

21. The method according to claim 20, the method further including:
c) transmitting the infrared signal (IIS) from the second IR transmitter and the data signal from a first IR transmitter,
d) setting the SNR threshold of a portable device based on a level of the transmitted IIS signal from the second IR transmitter.

22. The method according to claim 21, wherein steps (a)-(d) are performed sequentially.

23. The method according to claim 21, wherein steps (a) and (b) are performed in parallel with steps (c) and (d).

24. The method according to claim 20, wherein transmission of the IIS is initiated prior to the transmission of the data signal.

25. The method according to claim 24, wherein the IIS is transmitted concurrently with the data signal.

26. The method according to claim 24, wherein the IIS is transmitted prior to the data signal.

* * * * *